United States Patent [19]
Collins

[11] 3,825,072
[45] July 23, 1974

[54] ELECTRONIC UPPER LINK SENSING
[75] Inventor: Eldred L. Collins, Cedar Falls, Iowa
[73] Assignee: Allis-Chalmers Corporation, Milwaukee, Wis.
[22] Filed: Sept. 28, 1972
[21] Appl. No.: 293,131

[52] U.S. Cl. .................................................. 172/7
[51] Int. Cl. ........................................... A01b 63/112
[58] Field of Search ................. 172/7, 9, 2, 8, 10; 73/141 A, 144

[56] References Cited
UNITED STATES PATENTS
3,246,701  4/1966  Schulz .................................... 178/9
3,374,842  3/1968  Smith, Jr. ................................ 172/7
3,520,369  7/1970  Nicholson ............................... 178/7
3,554,025  1/1971  Andersson et al. ................... 73/144

Primary Examiner—Stephen C. Pellegrino
Attorney, Agent, or Firm—Arthur L. Nelson

[57] ABSTRACT

Electronic draft load sensing on the upper link of a three point hitch operating in combination with a hydraulic weight distribution system on a draft vehicle.

9 Claims, 4 Drawing Figures

ELECTRONIC UPPER LINK SENSING

This invention relates to draft load sensing and more particularly to electronic draft load sensing on the upper link of a three point hitch operating to control the hydraulic weight distribution system responsive to draft loads.

Various draft load sensing systems with three point hitches have been used on draft vehicles to control the weight distribution system. The hydraulic weight distribution system transfers weight from the front wheels to the rear wheels to provide increased tractor effort for the vehicle when an increased draft load is sensed. Conventionally a mechanical means is used to sense the draft load. The draft load may be sensed at the connection of the lower draft arms or the connection of the upper link to the vehicle. Normally the lower draft arms are connected to a mechanism to bend a crossbar or provide a torsion on the crossbar and the deflection or torsional distortion is sensed and this signal in turn is transmitted through a mechanical linkage to operate a hydraulic valve. The hydraulic valve in a weight distribution system controls a hydraulic ram to operate through a rock shaft, rock arms, and lift links to raise and lower the lower draft arms of the vehicle and accordingly raise or lower the implement. The purpose of the system is to provide adequate traction for the draft load required.

There are certain inherent disadvantages in a mechanical sensing means of operating the hydraulic weight distribution system. Friction losses are incurred in operating the control linkage and the draft mechanism and a hysteresis loss is incurred in the crossbar. Space is required on the vehicle for supporting the lower draft arms and the draft sensing mechanism and the linkage for controlling the control valve.

Upper link sensing has been used mechanically by a sensing mechanism which senses compression and tension in the upper link. Normally with a heavy draft load the implement has a tendency to pivot slightly on the connection between the lower draft arms and the implement. The increased draft load tends to place the upper draft link in compression and the compressive stress is sensed. A signal is transmitted through a mechanical linkage to control the hydraulic valve in the weight distribution system. An increased weight is transferred to the rear wheels to provide an increased tractive force required of the vehicle to overcome excessive slippage of the rear wheels. The lower draft arms are raised which in turn raises the implement and reduces the draft load required of the vehicle. This reaction to the increased draft load is controlled through the rock shafts, rock arms and lift links similar to that of the lower draft arm sensing mechanism and the lifting of the lower draft arms which in turn transfers weight from the front to the rear wheels to provide adequate tractive force to accomodate the increase in draft load. With a decrease in draft load, the reverse operation is provided. This type of a system is normally used with the implement mounted on the tractor.

Accordingly, this invention provides an upper link sensing unit which operates electronically to senses compressive load in the upper link. The compression and change of compression is sensed in the electronic circuit which operates to open and close the hydraulic valve which controls the weight distribution system. The upper link of the three point hitch is connected through a cantilever beam to the link support on the tractor. The cantilever beam is caused to move forwardly or rearwardly therby providing a compressive or tensive stress on a pair of strain guages. One of the strain guages is positioned on the forward side of the cantilever beam and the second is positioned on the rearward side of the cantilever beam to provide the sensing for the weight distribution system.

It is the object of this invention to provide electronic draft load sensing on the upper link of a three point hitch of a tractor.

It is another object of this invention to provide strain gauges in the upper link sensing of a three point hitch on a tractor.

It is a further object of this invention to provide strain gauge sensing in a cantilever beam supporting the upper link of a three point hitch to provide sensing of tensive and compressive stress on the upper link.

It is a further object of this invention to provide strain gauge sensing on a cantilever beam supporting the upper link of a three point hitch. A signal sensing compressive or tensive stress on the upper link is transmitted to a balanced electronic circuit which selectively operates to open and close a solenoid valve to control the hydraulic weight distribution system in response to tensive or compressive loads on said upper link.

The objects of this invention are accomplished by providing a three point hitch having suitable connection of the upper link and the lower draft arms with the draft vehicle. The three point hitch is adapted for connection to an implement. During normal operation, the upper link operates through degrees of compressive stress which in turn is transmitted to the bracket supporting the upper link. The bracket includes a cantilever beam extending downwardly from its support and the dependent portion incur a bending stress as it bends forwardly and rearwardly. A pair of strain gauges are positioned on the cantilever beam. One of the strain gauges is positioned on the forward side while the second of the strain gauges is positioned on the rearward side of the cantilever beam. An electrical signal from the strain gauges is applied to an electronic circuit which in turn operates through a relay circuit to operate a solenoid valve in the hydraulic weight distribution system. The system raises the implement thereby transferring weight from the front to the rear wheels to provide increased tractive effort for the draft vehicle with an increased load, or vice versa a decrease in the weight on the rear wheels while lowering the draft arms on the draft vehicle and the implement.

Referring to the drawings.

Figure 1:
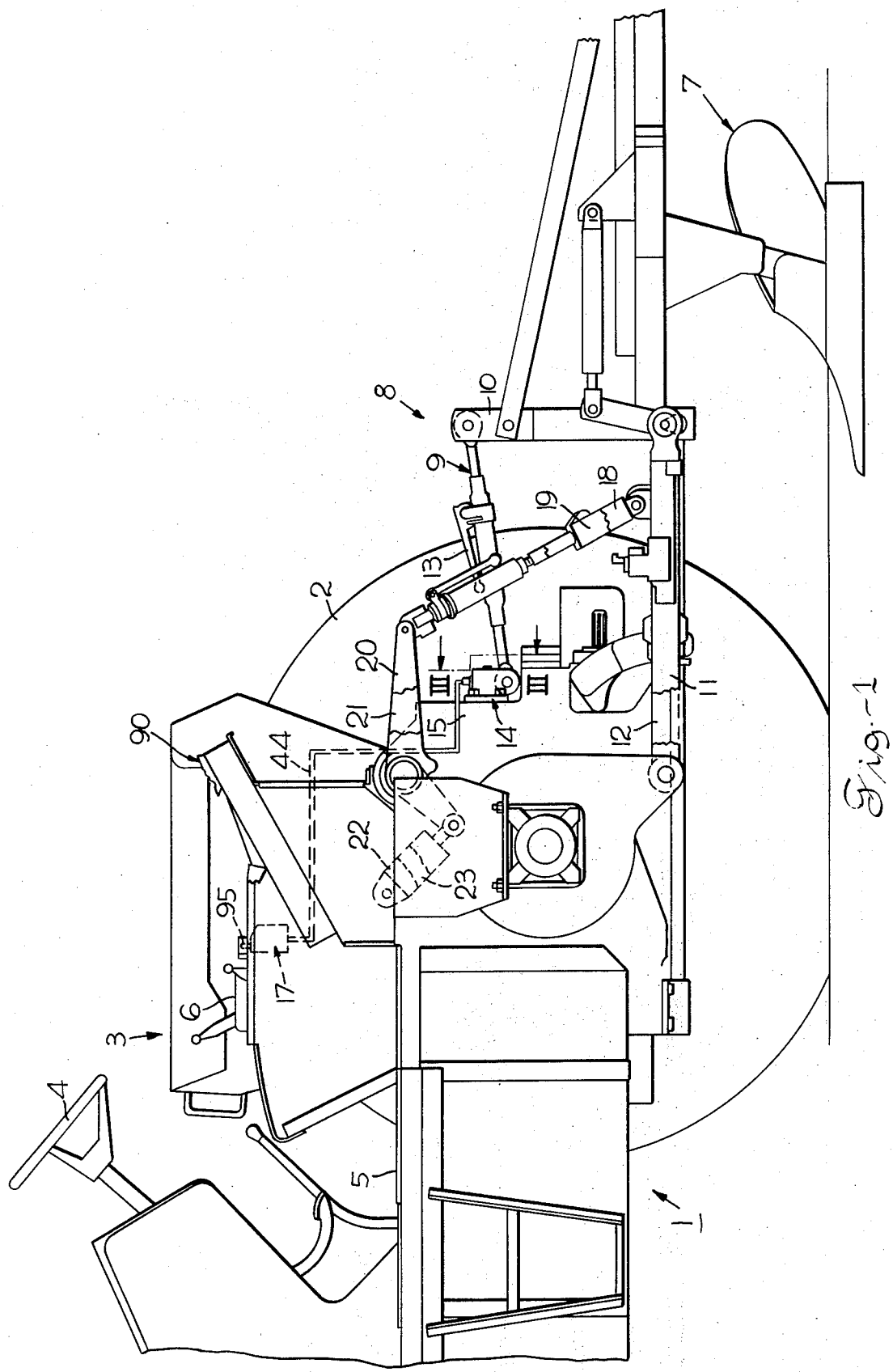
FIG. 1 illustrates a side elevation view of the draft vehicle and implements with a portion of the draft vehicle cut away to illustrate the relative position of the components.

Referring to FIG. 1 the tractor 1 is shown with the left wheel cut away and the right wheel 2 supporting the tractor. The operator's station 3 is defined by the steering wheel 4, platform 5, control panel 6 and portion of the seat 90. The tractor is shown connected to the implement 7.

The tractor shown is connected to the implement by the three point hitch 8. The upper link 9 is pivotally connected to the mast 10 of the implement. The upper link 9 is provided with an adjustable means 13 for shortening or lengthening the link 9 which operates to level the implement in operation and also adjusts the compression and tension of the upper link during normal operation. The upper link 9 is connected on its forward end to the bracket 14 which is bolted on the rear end housing 15. Strain gauges are mounted on the bracket 14 with suitable electrical conductors which connect to the electronic circuit 17 to control the hydraulic weight distribution system.

The lower draft arms 11 and 12 are connected through lift links 18 and 19 through the rock shaft arms 20 and 21. The rock shaft arms 20 and 21 are connected to the hydraulic lift cylinders 22 and 23. The hydraulic lift cylinders 22 and 23 in the hydraulic weight distribution system raise and lower the draft arms 11 and 12 which in turn raise and lower the implement in response to draft loads sensed by upper link sensing.

Figures 3, 4:
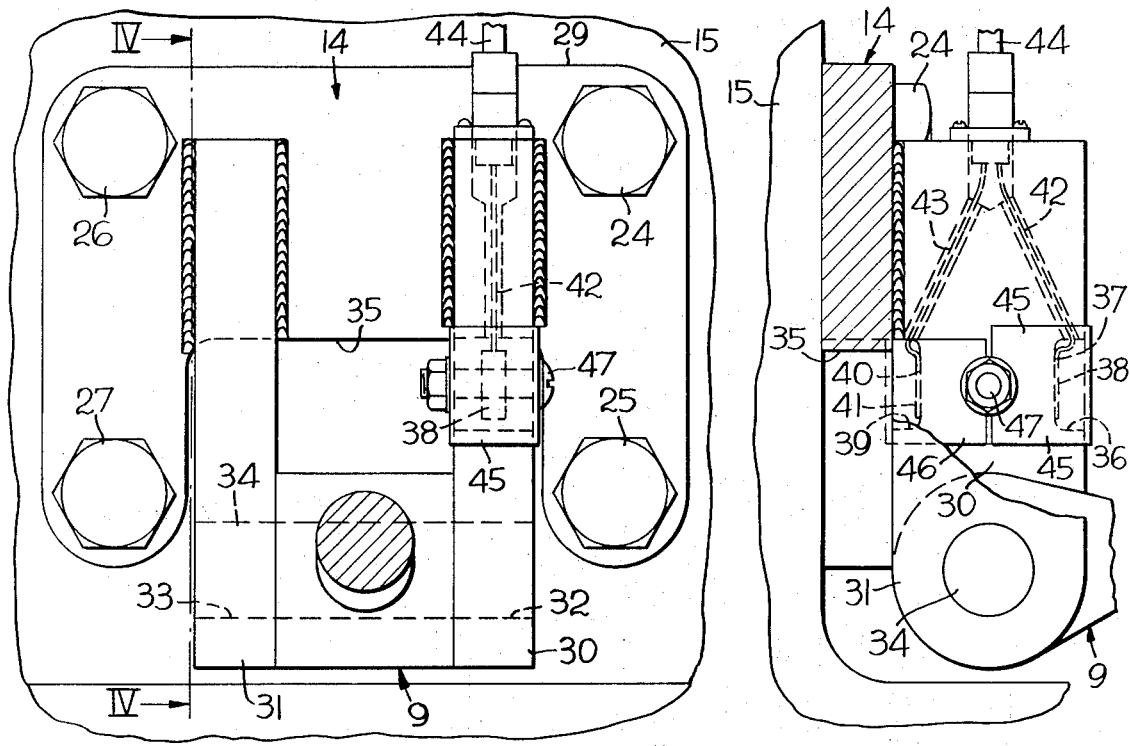
FIG. 3 illustrates a rear view of the brackets supporting the upper link.
FIG. 4 is a section view taken on line IV–IV of FIG. 3 illustrating a cantilever supporting the upper link and providing strain gauge sensing of the forces on the upper draft link.

Referring to FIGS. 3 and 4, the bracket 14 is shown mounted on the rear end housing 15 of the tractor 1. The bracket is supported by a plurality of bolts 24, 25, 26 and 27. The base 29 of the bracket 14 supports the cantilever beams 30 and 31. The cantilever beam 30 defines the hole 32 and cantilever beam 31 defines the hole 33 for receiving the pin 34. Cantilever beams 30 and 31 extend downwardly from the upper end which is welded to the base place 29. The dependent ends of the cantilever beams 30 and 31 are free to bend into the slot 35 of the base plate 29.

The cantilever beam 31 supports one side of the pin 34 which carries the end of the upper link 9. The cantilever beam 30 is shown carrying the strain gauges. Any suitable arrangement of strain gauges on the cantilever beams might be used. The arrangement of the components in the circuit required the strain gauges to sense the compressive and tensile forces although the sensitivity of the circuit could be altered by different arrangements of the strain gauges and also by the construction of each of the cantilever beams.

The cantilever beam 30 is formed with a recess 36 which forms a surface 37 to which is bonded a strain gauge 38. Similarly the cantilever beam 30 is formed with a recess 39 forming the surface 40 to which is bonded the strain gauge 41. The electrical conductors 42 and 43 transmit the signals from the strain gauges 38 and 41, respectively, through the cable 44. The cover plates 45 and 46 have a U-shaped cross-section and are fastened by bolt 47. The bolt 47 extends through the cantilever beam to connect the cover plate on the opposing side of the cantilever beam. This provides an enclosed assembly for the strain gauges to protect them from damage.

Figure 2:
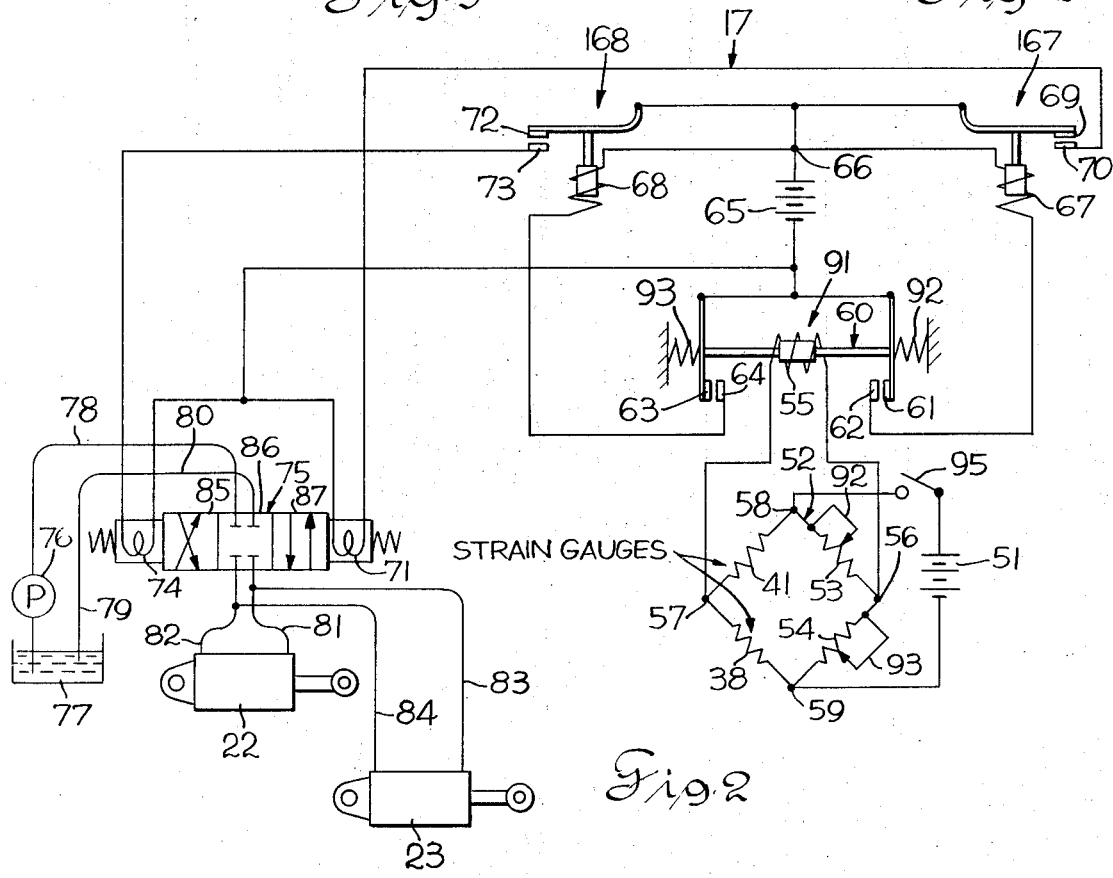
FIG. 2 illustrates an electronic circuit connected to the hydraulic weight distribution system schematically illustrated.

Referring to FIG. 2, electrical circuit 17 is illustrated. The electrical circuit includes a battery 51 which supplies the electrical energy for the bridge circuit 52. The bridge circuit generates electrical signals responsive to strain on the upper link. The bridge circuit includes a strain gauge 41, a strain gauge 38 connected in series across the battery forming two legs of the bridge circuit. Similarly, in parallel with these two legs are the variable resistor 53 and the variable resistor 54 in series across the battery. The junction 57 of the strain gauges 41 and 38 are connected to a relay coil 55. Junction 56 of the variable resistors 53 and 54 are connected to the opposite end of the relay coil 55 of relay 91. Accordingly, the relay coil 55 is connected between the terminals 56 and 57. The junctions 58 and 59 are connected to the battery. Junction 58 connects strain gauge 41 and the variable resistor 53 while junction 59 connects the strain gauge 38 with the variable resistor 54.

The relay coil 55 operates the armature 60 which is normally held in the neutral position by springs 92 and 93 as shown. The armature carries the contact 61 which is adapted for engagement of contact 62 and also carries the contact 63 which is adapted for engaging the contact 64. The contacts 61 and 63 are connected to the positive side of the battery 65. The positive terminal 66 of battery 65 is connected to the relay coil 67 and relay coil 68. Relay coil 67 and 68 are selectively connected across the battery in response to closing of contact 61 and 62 or contact 63 and 64 of relay 91.

The relay coil 67 operates the relay contacts 69 and 70 to close the circuit including a solenoid 71 which is also connected accross the battery 65 when the relay contacts 69 and 70 are closed. The relay coil 68 controls the closing of a relay contacts 72 and 73. The relay coil 68 is connected accross a battery 65 thereby placing the solenoid coil 74 accross the battery 65.

Solenoid valve 75 controls the flow of pressurized fluid from the pump 76. The pump 76 is operated by the vehicle engine and receives fluid from the reservoir 77. The pump pressurizes fluid in the conduit 78 which is connected to the solenoid valve 75. The return conduit 79 returns fluid to the reservoir 77 from the solenoid valve 75. The hydraulic cylinders 22 and 23 are supplied from the solenoid valve 75 selectively through conduits 81 and 83 or 82 and 84. The hydraulic cylinders 22 and 23 raise and lower draft arms 11 and 12.

The solenoid valve 75 has a first section 85, a second section 86, and a third section 87. Solenoid valve is normally biased to a neutral position as shown in FIG. 2 which blocks flow of fluid through the valve. When the solenoid valve is biased to the right or lefthand position, the sections 87 or 85 selectively transmit a pressurized fluid to the cylinders 22 and 23 for raising and lowering respectively of the lower draft arms which in turn raises or lowers the implement.

The operation of this device will be described in the following paragraphs.

The implement 7 is connected through the three-point hitch 8 to the tractor 1. The upper link 9 senses a compressive or tensive load in response to the draft load required to pull the implement 7. With a heavy draft load there is a tendency for the implement 7 to pivot about the pivotal connections of the lower draft arms 11 and 12 between the tractor and the implement. The upper link 8 is in a compressive state with a heavy load on the implement 7. When the draft load of the implement 7 is relatively light, the implement 7 tends to rotate in a clockwise direction around the pivot point of the pivotal points connecting the lower draft arms with the implement placing the upper link 9 in a tensive state. The bracket 14 which supports the upper link 8 senses the changing force due to the draft load of the implement 7.

The switch 95 controls energization of the bridge circuit 52 and is closed when the tractor and implement 7 are in operation. Referring to the electrical circuit, the bridge circuit 52 is normally balanced by adjusting the valve of variable resistors 53 and 54 to the desired draft load. With a balanced condition of the bridge circuit there is no current flow through the relay coil 55. When a compressive force is placed on the upper link 9 due to an increased draft load on the lower draft arms 11 and 12, the strain gauge 38 is in tension which increases its resistance while the strain gauge 41 is placed in compression which decreases its resistance. Accordingly, the voltage of terminal 57 is higher as compared to the terminal 56 and current will flow through the coil from terminal 56 to terminal 57. With a current flow from terminal 56 to terminal 57 the contacts 63 and 64 of relay 91 will close thereby causing relay coil 68 to energize and close contacts 72 and 73. With the contacts 72 and 73 closed, the solenoid coil 74 is energized thereby causing the solenoid valve to move in the lefthand direction placing the section 87 in operation.

The pump 76 pressurizes fluid which flows through the valve 75 from conduit 78 to conduits 81 and 83 and the base end of the cylinders 22 and 23 to extend the cylinders. Likewise, the fluid in the rod end of the cylinders 22 and 23 is permitted to flow out of the cylinder through the conduits 81 and 83 through conduit 79 to return to the reservoir. With valve 75 in this position, the lower draft arms are raised and the implement is raised reducing the draft load on the three-point hitch. This in turn will reduce the strain on the strain gauges causing the voltage on terminal 57 to return to the voltage on terminal 56. The contacts 63 and 64 of relay 91 will open and deenergize coil 68 of relay 168 opening contacts 72 and 73. This deenergizes solenoid coil 74 and allows the valve 75 to return to neutral.

When the draft load of the three-point hitch is reduced from a predetermined value the implement 7 tends to rotate in a clockwise direction about the pivotal connections between the lower draft arms 11 and 12 and the implement causing a reduction in compressive force on the upper link 9. This in turn produces reduction in the compressive stress in the strain gauge 38 and the tensive stress in the strain gauge 41. When this condition exists, the strain gauge 38 creates less resistance and the strain gauge 41 increases in resistance and the voltage of terminal 57 is lowered causing current to flow through the relay coil 55 from terminal 57 to 56. This in turn actuates the relay 91 closing contact 61 and 62 energizing the relay coil 67 closing contacts 69 and 70. With the relay coil 67 energized and contacts 69 and 70 closed, the battery voltage is placed across the relay coil 71. This biases the solenoid valve in the righthand direction. The pressurized fluid from the pump 76 is transmitted through the conduit 78 through the conduits 81 and 83 to the rod end of the cylinders 22 and 23. Similarly, the conduits 84 and 82 are connected to discharge fluid through the conduit 79 from the base ends of cylinders 22 and 23 to the reservoir 77 and the cylinders are contracted. With the contracting of cylinders, the rock shaft is rotated in the clockwise direction causing the lift links 18 and 19 to lower the draft arms 11 and 12. With the lowering of the draft arms 11 and 12, the implement 7 is lowered with a corresponding increased draft load and the three-point hitch in turn increases the strain on the strain gauge 38 and on the strain gauge 41 causing a balanced condition of the bridge circuit 52 and causing the contacts 61 and 62 of relay 91 to open and contacts 69 and 70 of relay 167 open and solenoid valve 75 returns to neutral due to spring forces.

The embodiments of the invention in which an exclusive property or privilege is claimed are defined as follows:

1. An electronic sensing system for use on a vehicle having a three-point hitch comprising, a pair of lower draft arms, and an upper link for connection to an implement, a bracket including a cantilever beam with mounting means supported on said vehicle, connecting means on said cantilever beam connected to said upper link, a strain gauge support portion on said cantilever beam intermediate said mounting means and said connecting means, a hydraulic weight distribution system on said vehicle having hydraulic means for raising and lowering said lower draft arms including a hydraulic valve having electrical operating means, an electronic control circuit including a strain gauge means and said electrical operating means for controlling said hydraulic valve in said hydraulic weight distribution system, said strain gauge means mounted on said strain gauge support portion of said bracket for sensing compressive and tensive forces from said upper link to thereby control said hydraulic weight distribution system for raising and lowering said draft arms responsive to draft loads on said three-point hitch.

2. An electronic sensing system for use on a vehicle having a three-point hitch as set forth in claim 1, a strain gauge positioned forwardly on said cantilever beam, a strain gauge positioned rearwardly on said cantilever beam for operating in compression and tension to sense draft loads on said three-point hitch.

3. A hydraulic sensing system for use on a vehicle having a three-point hitch as set forth in claim 1 wherein said electrical operating means of said hydraulic valve includes, a solenoid having at least one coil connected in said electronic circuit to operate said hydraulic valve in response to draft loads on said three-point hitch.

4. An electronic sensing system for use on a vehicle having a three-point hitch as set forth in claim 1 wherein said bracket includes a base defining said mounting means for connection to the vehicle, two cantilever beams positioned on said base and connected to said upper link through said connecting means, means supporting said strain gauge means on at least one of said cantilever beams.

5. An electronic sensing system for use on a vehicle having a three-point hitch as set forth in claim 1 including means defining a recess means on said cantilever beam for receiving said strain gauge means.

6. An electronic sensing system for use on a vehicle having a three-point hitch as set forth in claim 1 wherein said bracket includes recessed means for receiving said strain gauge means, means for covering said recessed means thereby providing an enclosed compartment for said strain gauge means.

7. An electronic sensing system for use on a vehicle having a three-point hitch as set forth in claim 1 wherein said electronic circuit includes means sensing a change in voltage across said strain gauge means responsive to draft loads, electrical adjusting means for presetting a voltage for comparison with the voltage across said strain gauge means thereby providing a zero signal at a predetermined draft load.

8. An electronic sensing system for use on a vehicle having a three-point hitch as set forth in claim 1 wherein said strain gauge means include two strain gauges, said strain gauge support portion includes means for positioning one said strain gauge to operate in tension and one of said strain gauges to operate in compression and vice versa.

9. An electronic sensing system for use on a vehicle having a three-point hitch as set forth in claim 8 wherein said strain gauge means includes two strain gauges connected in series, means sensing the change in voltage at the junction of said strain gauges responsive to draft loads on said three-point hitch.

* * * * *